(12) United States Patent
Goto et al.

(10) Patent No.: US 10,036,464 B2
(45) Date of Patent: Jul. 31, 2018

(54) RAILWAY VEHICLE GEAR DEVICE OF PARALLEL CARDAN DRIVE SYSTEM

(71) Applicant: TOYO DENKI SEIZO KABUSHIKI KAISHA, Tokyo (JP)

(72) Inventors: Kenichi Goto, Yokohama (JP); Yoshihiko Otsuka, Yokohama (JP); Satoshi Hayashi, Yokohama (JP)

(73) Assignee: TOYO DENKI SEIZO KABUSHIKI KAISHA, Tokyo (JP)

( * ) Notice: Subject to any disclaimer, the term of this patent is extended or adjusted under 35 U.S.C. 154(b) by 386 days.

(21) Appl. No.: 14/908,915

(22) PCT Filed: Jul. 30, 2014

(86) PCT No.: PCT/JP2014/004013
§ 371 (c)(1),
(2) Date: Jan. 29, 2016

(87) PCT Pub. No.: WO2015/015806
PCT Pub. Date: Feb. 5, 2015

(65) Prior Publication Data
US 2016/0178046 A1    Jun. 23, 2016

(30) Foreign Application Priority Data

Aug. 2, 2013  (JP) ................................ 2013-161118

(51) Int. Cl.
*F16H 55/08* (2006.01)
*B61C 9/50* (2006.01)
(Continued)

(52) U.S. Cl.
CPC .............. *F16H 55/08* (2013.01); *B61C 3/00* (2013.01); *B61C 9/38* (2013.01); *B61C 9/50* (2013.01);
(Continued)

(58) Field of Classification Search
CPC .............................. F16H 55/0886; F16H 1/08
See application file for complete search history.

(56) References Cited

U.S. PATENT DOCUMENTS 3,180,169 A * 4/1965 Wildhaber .............. F16H 55/08
74/410
3,327,548 A * 6/1967 Welch ................. F16H 55/0806
74/410
(Continued)

FOREIGN PATENT DOCUMENTS

JP    5-116026 A    5/1993
JP    8-197332 A    8/1996
(Continued)

OTHER PUBLICATIONS

International Search Report dated Oct. 21, 2014, issued in counterpart application No. PCT/JP2014/004013 (2 pages).

*Primary Examiner* — Terence Boes
(74) *Attorney, Agent, or Firm* — Westerman, Hattori, Daniels & Adrian, LLP

(57) ABSTRACT

A low-cost railway vehicle gear device of parallel cardan drive system is provided in which the vibrations and noises can be reduced only by means of 2-D tooth surface modifications. In a railway vehicle gear device of parallel cardan drive system having a helical pinion (1) and a helical gear wheel (2), a pinion and a gear wheel respectively having gear specifications of module of 4 to 8, pressure angle of 20 to 30°, and helix angle of 15 to 30°, crowning is performed on a gear surface in the flank line direction of the pinion. The tooth surface (11) has a shape of a sinusoidal curve with an apex (11a) being positioned in a central area of the face width direction of the pinion, the sinusoidal curve being expressed by a single sinusoidal function and extending over an entire width in the face width direction of the helical pinion.

6 Claims, 7 Drawing Sheets

(51) Int. Cl.
    *B61C 3/00*         (2006.01)
    *B61C 9/38*         (2006.01)
    *F16H 1/08*         (2006.01)
    *F16C 19/36*       (2006.01)
    *F16C 19/54*       (2006.01)

(52) U.S. Cl.
    CPC ........... *F16H 1/08* (2013.01); *F16H 55/0886*
        (2013.01); *F16C 19/364* (2013.01); *F16C*
      *19/547* (2013.01); *F16H 2055/0893* (2013.01)

(56) References Cited

U.S. PATENT DOCUMENTS

| | | | |
|---|---|---|---|
| 2005/0028630 A1* | 2/2005 | Hagihara | B41J 23/02 74/458 |
| 2005/0081668 A1* | 4/2005 | Hagihara | F16H 1/08 74/458 |
| 2007/0042860 A1* | 2/2007 | Rihn | F16H 55/0886 475/344 |
| 2008/0196530 A1* | 8/2008 | Shimada | F16H 1/20 74/457 |

FOREIGN PATENT DOCUMENTS

| | | |
|---|---|---|
| JP | 8-285048 A | 11/1996 |
| JP | 10-6136 A | 1/1998 |
| JP | 2965913 B2 | 10/1999 |
| JP | 4952362 B2 | 6/2012 |

\* cited by examiner

RAILWAY VEHICLE GEAR DEVICE OF PARALLEL CARDAN DRIVE SYSTEM

TECHNICAL FIELD

The present invention relates to a railway vehicle gear device of parallel cardan drive system having a pair of helical pinion and a helical gear wheel, each having gear specifications of module of 4 to 8, pressure angle of 20 to 30°, and helix angle of 15 to 30°.

BACKGROUND ART

Railway vehicles of parallel cardan drive system transmit torques generated by main electric motors which are fixed to bogies, to rotation axes through flexible couplings and gear devices to rotate vehicle wheels disposed on axles, thereby causing the railway vehicles to travel on rails. Each of the gear devices to be used for this kind of railway vehicles (hereinafter simply referred to as a "gear device") is equipped with a helical gear wheel (large gear) (hereinafter simply referred to as a "gear wheel") and a helical pinion (small gear) (hereinafter simply referred to as a "pinion") which are rotated in gearing mesh with each other to thereby transmit torque. In this case, the pinion fixed to a rotation axis which is coupled to a flexible coupling, and the gear wheel fixed to a drive axle is housed in a gear box. Rotation axis portions located on both axial sides of the pinion are rotatably supported by the gear box through respective first tapered roller bearings, and drive axle portions located on both axial sides of the gear wheel are rotatably supported by the gear box through respective second tapered roller bearings.

In this kind of gear device, in case the viscosity of lubricating oil to be supplied to the tapered roller bearings changes due, for example, to the change in temperature, thereby giving rise to poor lubrication, there will occur such a problem as a seizure of the tapered roller bearings. As a solution, this kind of gear device is assembled such that the axial clearance between an inner ring and an outer ring, respectively, of each of the first and the second tapered roller bearings and the respective rollers, i.e., the alignments of the so-called end play value ($\sigma$s) are performed by means of shims. As compared with end play values (20 to 30 μm) in ordinary industrial gear devices, it is normal practice to assemble the railway vehicle gear devices with very large end play values (e.g., $\sigma$s: 60 to 170 μm on the pinion side and $\sigma$s: 80 to 210 μm on the gear wheel side). In case end play value is set to a large value, rattling about the rotation axis of the tapered roller bearings increases and, accompanied thereby, the inclination of the rotation axis in the axial center of the pinion also increases. As a result, at the time of traveling of the vehicle (at the time of rotation of the pinion), accompanied by the vibrations of the flexible coupling, large precession occurs to the pinion, thereby bringing about bad effect on the gearing mesh of the pair of the gear wheel and the pinion.

It is to be noted here that the end play value is set still larger on the side of the gear wheel as compared with the end play value of the pinion. Ordinarily, the drive axle itself to which the gear wheel is fixed is larger in axial length, and is supported on the rails by means of wheels which are fitted onto an outside of each side of the drive axle. For the above-mentioned reasons and for other reasons, even if the end play value is set to a larger value, there can be considered little or no effect on the gearing mesh of the gear wheel and the pinion that make a pair. Such being the case, with respect to the gear wheel, tooth profile modification on the tooth surface in the tooth depth direction, and crowning and relieving modifications on the tooth surface in the flank line direction are not conventionally performed. Instead, it is normal practice to perform, with respect only to the pinion, tooth profile modification on the tooth surface in the tooth depth direction, and crowning and relieving modifications on the tooth surface in the flank line direction to thereby improve the gearing mesh between the pinion and the gear wheel and the pinion.

In other words, with respect, e.g., to tooth profile modifications are performed over an entire face width in the flank line direction in a uniform shape, e.g., in a predetermined tooth tip range and in a predetermined tooth root range by predetermined values (e.g., 20 to 30 μm in case of 70 mm of face width); crowning is performed on the tooth surface in the flank line direction by a predetermined value (e.g., 20 μm) of an arc curve (e.g., radius R≈17685 mm) over the central area in the face width direction of the tooth surface; and also relieving (modification) of a predetermined value (e.g., 50 μm) is performed on both sides in the face width direction by an arc curve of a radius that is different from the arc curve at the time of the crowning. In this manner the two-dimensional (2-D) tooth surface modification is performed by making, to serve as a predetermined value (e.g., 70 μm), the amount of modification in the flank line direction by adding the crowning and relieving on both end surfaces in the face width direction.

By the way, as a result of higher rotary speed of the electric motors at a request for further speeding up of railway vehicles nowadays, the rotary speed of revolutions of pinions is ever increasing. Therefore, when torque is transmitted between the gear wheel and the pinion, the above-mentioned tooth profile modifications bring about a decrease in the tooth bearing area, resulting in lowering of contact gear ratio. As a result, a problem arises in that an overall value of vibrations and noises that are generated at the time of gearing mesh of the gear wheel and the pinion becomes larger and also that such a main component of the overall value as is the frequency of the noises to be generated when the gear wheel and the pinion get into gearing mesh with each other is changing toward high-frequency ranges of 2000 to 3000 Hz. The noises at this kind of frequency band are most sensitive to the human acoustic senses on the loudness-level contours. As compared with the noises of the frequency band below 1000 Hz at the same phon unit, the human being feels the noises to be more noisy by about 10 times, thereby giving him/her discomfort.

Conventionally, as a method of reducing vibrations and noises that are generated when the gear wheel and the pinion come into gearing mesh with each other, there is known in Patent Document (1) the following art, namely, a method for performing a three-dimensional (3-D) bias tooth surface modification on the tooth surface of a helical gear, while leaving a complete contact line area of a width which is an integer multiple of a contact line pitch in the face width direction, such that contact does not occur on the tooth surface other than the complete contact line area at the time of gearing mesh (i.e., a 3-D tooth surface modification known as so-called bias-out is performed on the tooth surface in a manner in which the shape of tooth profile of the tooth surface in the tooth depth direction varies successively with the position in the flank line direction). Further, there is known in Patent Document (2) an art in which, an effective gearing mesh area of the tooth surface of a helical gear is subjected to crowning by an amount of 5 to 20 μm in the gear mesh contact line direction of the tooth surface.

The tooth surface modifications are such that the maximum bias amount of modification becomes 10 to 40 μm after adding the above-mentioned crowning in the gear mesh contact line direction and the crowning for the purpose of addendum and dedendum modifications as well as flank line modification (i.e., a 3-D tooth surface modifications known as so-called bias-in is performed such that the shape of tooth profile of the tooth surface in the tooth depth direction successively varies with the position in the flank line direction).

However, since the methods in each of the above-mentioned patent documents performs the 3-D tooth surface modifications, the tooth surfaces can no longer be machined with widely used conventional gear grinding machines that are capable of performing 2-D tooth surface modifications. Therefore, expensive and high-performance gear grinding machines become necessary, thereby necessitating a vast amount of equipment investment. Further, machining for performing 3-D tooth surface modifications take longer time (at least more than 5 times of machining time) than the time for performing 2-D tooth surface modifications, thereby largely lowering the productivity. As a result, there is a problem in that the manufacturing of helical gears takes a vast amount of cost.

PRIOR ART DOCUMENTS

Patent Documents

Patent Document 1: Japanese Patent No. 2965913
Patent Document 2: Japanese Patent No. 4952362

DISCLOSURE OF THE INVENTION

Problems to be Solved by the Invention

In view of the above-mentioned points, this invention has a problem of providing a low-cost railway vehicle gear device of parallel cardan drive system in which the vibrations and noises, that are generated when the gear wheel and the pinion are meshed with each other, can be reduced only by means of 2-D tooth surface modification.

Means for Solving the Problems

In order to solve the above-mentioned problem, this invention is a railway vehicle gear device of parallel cardan drive system comprising a helical pinion and a helical gear wheel which together constitute a helical gear pair and which respectively have gear specifications of module of 4 to 8, pressure angle of 20 to 30°, and helix angle of 15 to 30°. Crowning is performed on a tooth surface in a flank line direction of the helical pinion. The railway vehicle gear device of this invention is characterized in that the tooth surface of the helical pinion has a shape of a sinusoidal curve that can be expressed by a single sinusoidal function with an apex being positioned in a central area in a face width direction of the helical pinion, and that the sinusoidal curve extends over an entire width in the face width direction of the helical pinion.

According to the above arrangement, even in case a large precession occurs in the helical pinion during the rotation of the helical pinion, the helical pinion and the helical gear wheel keep tooth bearing with each other to follow the precession. As a result, the tooth bearing area can be secured to the maximum extent possible, thereby resulting in an improvement in the contact gear ratio. Consequently, there can be reduced the vibrations and noises, inclusive of the side bands, that are generated when the helical pinion and the helical gear wheel get into gearing mesh with each other. Further, since only crowning is performed so as to have the shape of a sinusoidal curve, there can be used conventional gear grinding machines of common use that can perform 2-D tooth surface modifications, thereby performing a similar job in an equivalent time. The costs for manufacturing the helical gears can thus be prevented from rising.

By the way, in case the helical pinion fixed to a rotation axis is housed inside a gear box, and rotation axis portions positioned on both axial sides of the helical pinion are respectively supported rotatably by the gear box through tapered roller bearings, the middle point in the face width direction of the helical pinion and the middle point between load application points of both the tapered roller bearings can be regarded to be substantially in agreement with each other provided: that (1) each of these tapered roller bearings is identical with one another in type and in specification; that (2) the distance between the center in the face width direction of the helical pinion and the positions in which the tapered roller bearings are respectively disposed is equivalent to each other; and that (3) the rigidity (the shape and displacement in the relevant portions are identical) of the gear box portions which support the tapered roller bearings is equivalent to each other. However, if at least one of the above-mentioned items (1) to (3) is different, the middle point in the face width direction of the helical pinion and the middle point between load application points of both the tapered roller bearings will deviate from each other, the contact gear ratio cannot always be effectively improved. In such a case, the central area may be understood to be present between the center in the face width direction of the helical pinion and the middle point between the load application points of both the tapered roller bearings. According to this arrangement, the space of the tooth bearing area can surely be secured and the contact gear ratio can be improved.

In the first embodiment, preferably an amount of modification $R_1$ when the crowning is performed is set within a range of the following formula (1)

$$A \times \frac{Cm}{\sqrt{1 - \cos^2\alpha \times \sin^2\beta}} \leq R_1 \leq B \times \frac{Cm}{\sqrt{1 - \cos^2\alpha \times \sin^2\beta}}$$

where Cm is a maximum clearance in the flank line direction between the helical pinion and the helical gear wheel, the maximum clearance being capable of occurrence as a result of precession of the helical pinion while rotating, α is a pressure angle, β is a helix angle, and A, B are influence coefficients relative to the degree of deformation when the helical pinion contacts the helical gear wheel.

Further, in order to solve the above-mentioned problem, according to the second embodiment of this invention, there is provided a railway vehicle gear device of parallel cardan drive system comprising a helical pinion and a helical gear wheel which together constitute a helical gear pair and which respectively have gear specifications of module of 4 to 8, pressure angle of 20 to 30°, and helix angle of 15 to 30°. The gear device is characterized in that the tooth surface of the helical pinion in the flank line direction is subjected to crowning in a sinusoidal curve that can be expressed by a single sinusoidal function and extends over a range of above 55% of a total width, in the face width direction, of the helical pinion, and that the remaining portion on both end sides in the face width direction is subjected to relieving in an arc shape.

According to the above arrangement, in a manner similar to the first embodiment, during the rotation of the pinion, the pinion and the gear wheel come into tooth bearing with each other so as to follow the precession of the pinion. In this manner, as compared with the above-mentioned conventional example as described above, the space of the tooth bearing area can be secured still furthermore, thereby improving the contact gear ratio. In this manner, the vibrations and the noises inclusive of the side bands to be generated when the pinion and the gear wheel are meshed with each other, can be reduced. In this case, since the performance is only to perform 2-D modifications in the form of crowning and relieving on the tooth surface in the flank line direction, in a manner similar to the first embodiment, the increase in the cost for manufacturing the helical gear can be restrained.

By the way, in the second embodiment, an amount of modification $R_2$ in the flank line direction when adding the crowning and the relieving on both the end surfaces of the face width shall preferably be set within a range of the following formula (2)

$$A \times \frac{Cm}{\sqrt{1-\cos^2\alpha \times \sin^2\beta}} \leq R_2 \leq B \times \frac{Cm}{\sqrt{1-\cos^2\alpha \times \sin^2\beta}}$$

where Cm is a maximum clearance in the flank line direction between the helical pinion and the helical gear wheel, the maximum clearance being capable of occurrence as a result of precession of the helical pinion while rotating, $\alpha$ is a pressure angle, $\beta$ is a helix angle, and A, B are influence coefficients relative to a degree of deformation when the helical pinion contacts the helical gear wheel.

MODES FOR CARRYING OUT THE INVENTION

A description will hereinbelow be made, by reference to the drawings, of an embodiment (first embodiment) in which this invention is applied to a railway vehicle gear device of parallel cardan drive system.

Figure 1:
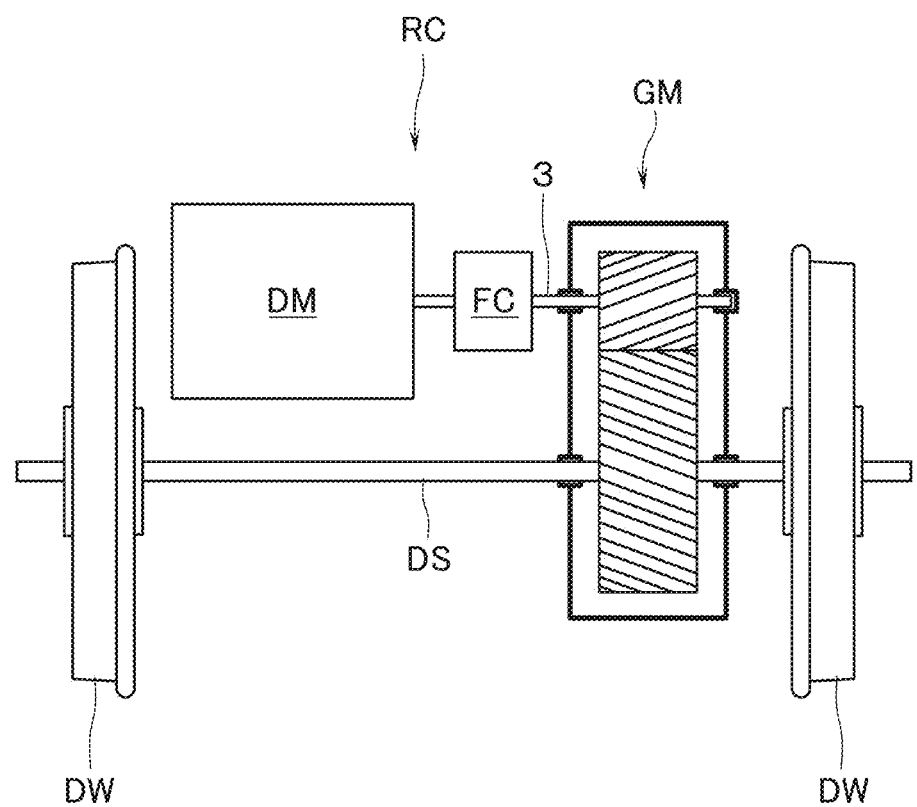
FIG. 1 is a schematic diagram showing an arrangement of a railway vehicle gear device of parallel cardan drive system.

With reference to FIG. 1, reference numeral RC denotes a railway vehicle of parallel cardan drive system. The railway vehicle RC is provided with a main driving motor DM which is fixed to a bogie of the railway vehicle (not illustrated), and a gear apparatus GM which is coupled to the main driving motor DM through a flexible coupling FC. A torque that is generated by the main driving motor DM is transmitted to a drive axle DS through the flexible coupling FC and the gear apparatus GM so that a pair of right and left wheels DW, DW that are disposed on the drive axle DS are rotated to thereby travel along rails (not illustrated). It is to be noted that, as to the constituting elements such as the main driving motor DM, the flexible coupling FC and the like, known ones may be utilized. Therefore, detailed descriptions thereof are omitted.

With reference to FIG. 2, the gear apparatus GM is provided with a helical pinion (small gear) (hereinafter referred to as a "pinion 1") and a helical gear wheel (large gear) (hereinafter referred to as a "gear wheel 2") which make a pair. The pinion 1 and the gear wheel 2 are rotated while being brought into gearing mesh with each other to thereby transmit the torque. The pinion 1 and the gear wheel 2 are manufactured so as to have gear specifications of module of 4 to 8, pressure angle of 20 to 30°, and helix angle of 15 to 30°, respectively. The pinion 1 fixed to a rotation axis 3 that is coupled to the flexible coupling FC, and the gear wheel 2 fixed to the drive axle DS are housed inside a gear box 4. Rotation axis 3 portions positioned on axially both sides of the pinion 1 are rotatably supported by the gear box 4 through first tapered roller bearings $5_1$, $5_2$, respectively. The drive axle DS located on axially both sides of the gear wheel 2 is rotatably supported by second tapered roller bearings $6_1$, $6_2$, respectively.

The first tapered roller bearings $5_1$, $5_2$ are known ones having the same construction that is each provided with an inner ring 51 to be shrink-fit into the rotation axis 3, rollers 52, a retainer 53, and an outer ring 54. In bearing mounting portions of the gear box 4 there are provided holding plates 55a, 55b which, also serving as cover bodies, sandwich the inner rings 51 from the axially both sides against the pinion 1. On the other hand, second tapered roller bearings $6_1$, $6_2$ are also known ones with the same construction that is each provided with an inner ring 61 to be shrink-fit into the drive axle DS, rollers 62, a retainer 63, and an outer ring 64. In the bearing-mounting portions of the gear box 4, there are fixed cover bodies 41a, 41b to be fitted onto an outside of the outer ring 64. In addition, bearing holders 65 to hold the inner ring 61 from axially both sides are fixed by shrink fit to the drive axle DS. Then, when the gear wheel 2 is rotated, the lubricating oil (not illustrated) contained inside the bottom portion of the gear box 4 is lifted so as to lubricate the gearing-mesh surfaces of the pinion 1 and the gear wheel 2, and the tapered roller bearings $5_1$, $5_2$, $6_1$, $6_2$.

By the way, in this kind of gear device GM, in case the viscosity of the lubricating oil changes due, for example, to the change in temperature, thereby giving rise to poor lubrication, there will occur such a problem as a seizure of the tapered roller bearings $5_1$, $5_2$, $6_1$, $6_2$. As a solution, the alignments of the respective clearances in the axial direction between the inner rings 51, 61 and the outer rings 54, 64 of the first and the second tapered roller bearings $5_1$, $5_2$, $6_1$, $6_2$ and rollers 52, 62, i.e., the adjustments of so-called end play values (σs), are made by means of shims 7a, 7b (see FIG. 2(a)). And also setting is made such that each end play value (σs) becomes 60 to 170 μm on the side of the pinion and 80 to 210 μm on the side of the gear wheel. In this manner, when the end play value (σs) of the pinion 1 is set to a large value in assembling the pinion 1, rattling of the tapered roller bearings $5_1$, $5_2$ around the rotation axis 3 becomes large. Accompanied by this, the axial center of the rotation axis 3 of the pinion 1 will be inclined within an angular range from +0 to −0 (see FIG. 2(b)). As a result, when the flexible coupling FC vibrates at the time of running (i.e., at the time of rotation of the pinion), the pinion 1 will give rise to a large precession. The pinion 1 and the gear wheel 2, that make a pair, will be ill affected in the gearing mesh.

Figure 3:
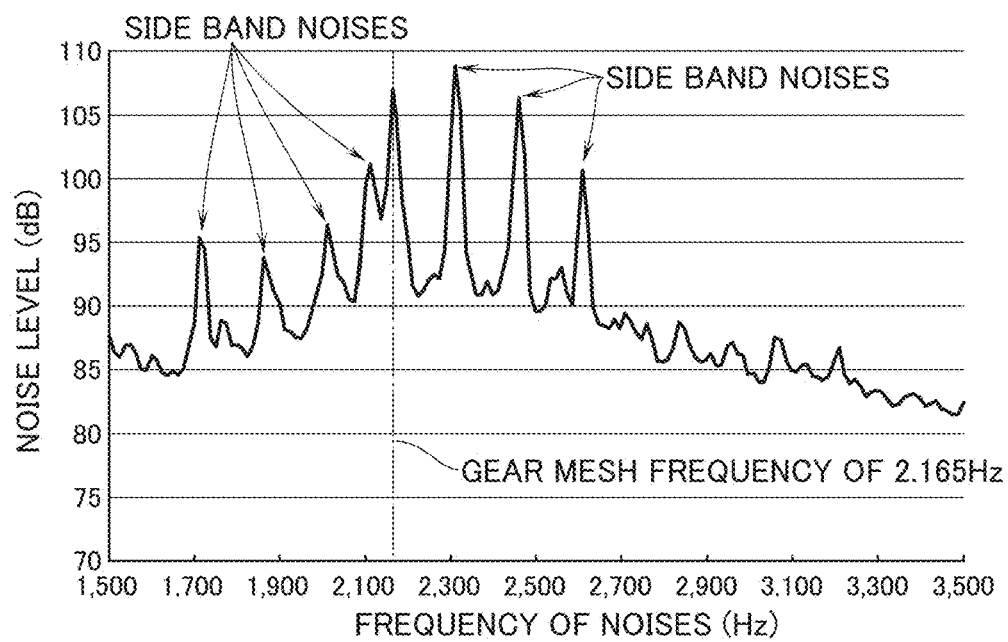
FIG. 3 is a graph showing the results of frequency analysis obtained by measuring the noises of a conventional gear device and by carrying out frequency-analysis of the measured data with an FFT analyzer.

Here, noise measurements were made in the conventional example of the gear device as described above having the above-mentioned pinion and the gear wheel at the number of rotation of the pinion 1 of 4480 rpm. The results of the measurements were subjected to fast Fourier transform (FFT) analyzer to analyze the frequencies, and the results are shown in FIG. 3. According to the results of measurements, the following has been confirmed, i.e.: that, at a gear mesh frequency of 2165 Hz there appeared a crest of peak noises at which the noise level becomes large; and that several peak noises (hereinafter simply referred to as "side bands") appeared on both sides of the crest, at certain frequencies in the form of a low-frequency domain and a high-frequency domain. Judging from the above, the conventional gear device is considered to have given rise to a decrease in the tooth bearing area by the pinion and the gear wheel when they rotate in gearing mesh with each other, thereby giving rise to shortage in the contact gear ratio.

Figure 4:
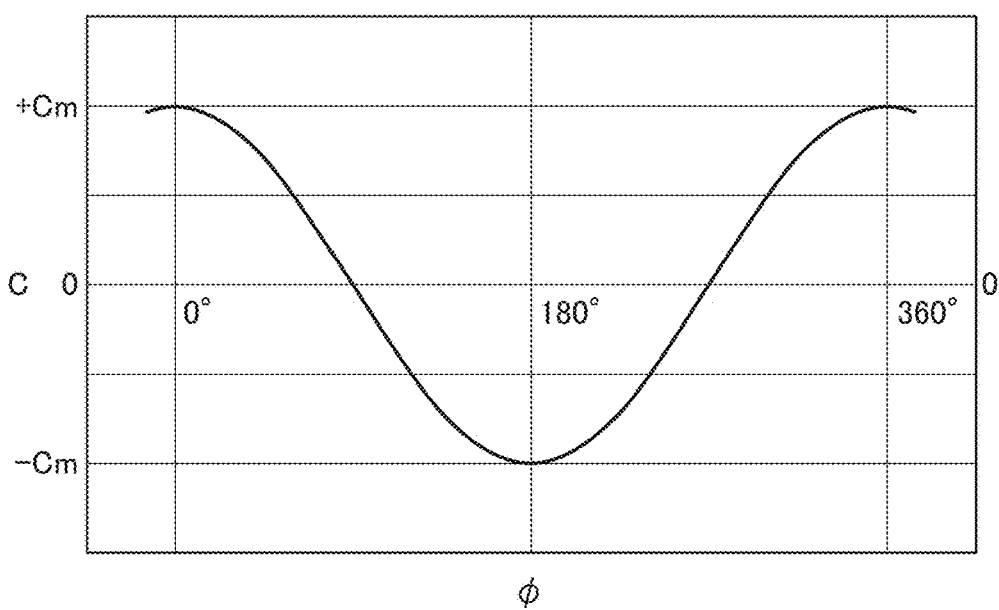
FIG. 4 is a graph showing the result of simulation analysis of a change in the clearance in the flank line direction of the pinion tooth surface relative to the tooth surface of the gear wheel in a conventional gear device.
Figure 5A:
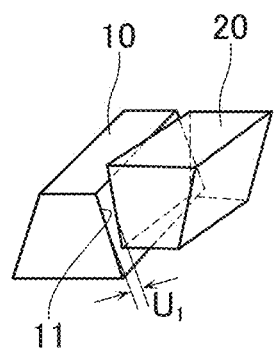
FIG. 5(a) and FIG. 5(b) are perspective views to explain the clearance to be generated between the tooth surfaces of the pinion and the gear wheel.
Figure 5B:
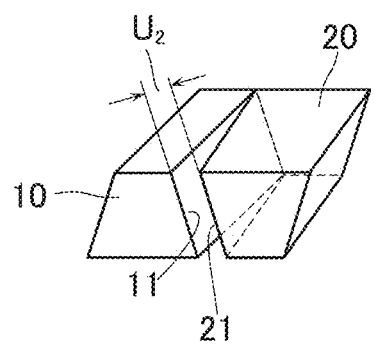

Then, as a result of continuous and strenuous studies, the inventors of this invention carried out simulation analyses to see how the clearance, in the flank line direction, of the tooth surface of the pinion relative to the tooth surface of the gear wheel varies, the clearance being generated as a result of precession of the pinion where the rotary phase angle of the rotation axis is φ. The inventors then obtained a finding that, while the pinion makes half a rotation within a range of 0° to 180° of the rotary phase angle φ of the pinion, the clearance follows a trajectory along a sinusoidal curve that can be expressed by a single sinusoidal function from a maximum clearance+Cm to a minimum clearance−Cm as shown in FIG. 4. The clearance C is defined, as shown in FIGS. 5(a) and 5(b), to be a clearance that is generated, when the pinion 1 and the gear wheel 2 have an error in the flank line direction or an error in parallelism in the rotation axis, in one end edge in the flank line direction between the tooth surfaces 11, 21 of the pinion 1 and the tooth surface 20 of the gear wheel 2 when the pinion and the gear wheel rotate in gearing mesh with each other. The clearance in question is obtained by adding the clearance $U_1$ due to the error in parallelism and the clearance $U_2$ due to an offset error.

Figures 2A, 2B, 2C:
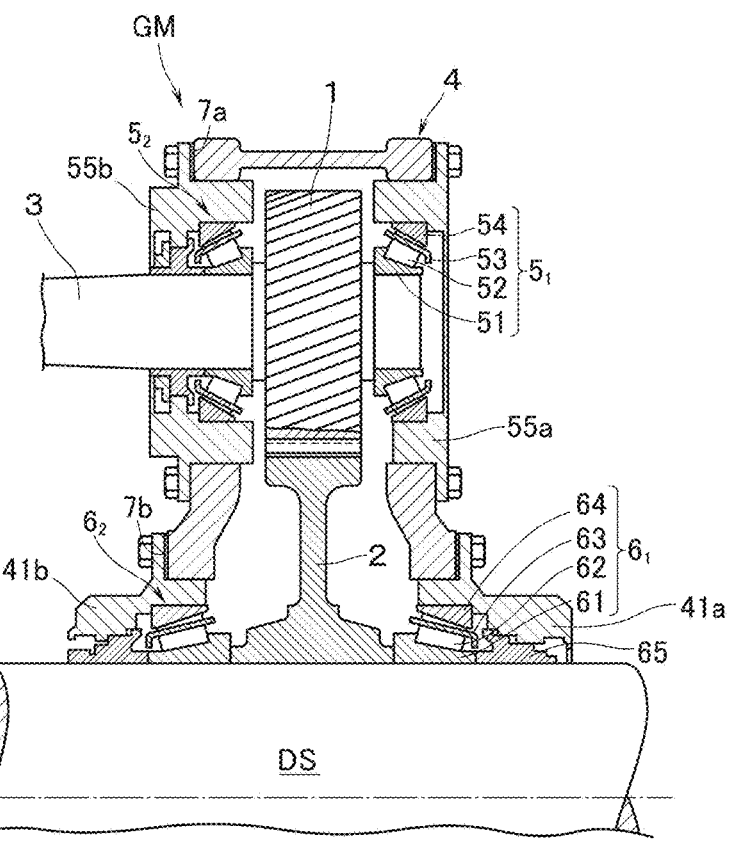
FIG. 2(a) is a side view, partly shown in section, of a gear device according to this invention.
FIG. 2(b) is a sectional view showing in further enlargement the pinion and FIG. 2(c) is a diagram to explain the tooth surface modification in the flank line direction of the pinion.

Based on the above-mentioned finding, in this embodiment crowning was performed, as shown in FIG. 2(c), on the tooth surface 11 in the flank line direction such that an apex 11a is positioned in the central area in the face width GW direction of the pinion 1 and that the tooth surface 11 has a shape of a sinusoidal curve that can be expressed by a single sinusoidal function and that extends over an entire width in the face width GW direction of the pinion 1. Here, as described above, in case the pinion 1 fixed to the rotation axis 3 is housed inside the gear box 4 and in case the rotation axis 3 portions located on axially both sides of the pinion 1 are respectively rotatably supported by the gear box 4 through the tapered roller bearings $5_1$, $5_2$, the central point GC in the face width GW direction of the pinion 1 and the middle point in the distance between the load application points of both the tapered roller bearings $5_1$, $5_2$ can be regarded to be substantially coincident with each other provided: (1) that the type and specifications of each of the tapered roller bearings $5_1$, $5_2$ are the same; (2) that the distance from the center in the face width direction of the pinion 1 to the position in which the tapered roller bearings $5_1$, $5_2$ are respectively disposed is substantially equal to each other; and (3) that the rigidities of the portions of the gear box 4 to support the tapered roller bearings $5_1$, $5_2$ are equal to each other (the shape and the amount of displacement of the portions in question are identical). In this kind of case, the apex 11a may be positioned on the center line GL that passes through the center GC in the face width GW direction.

On the other hand, if at least one of the above conditions (1) to (3) is different from the others, as shown, e.g., in FIG. 2(b), if the distance from the center in the face width GW direction of the pinion 1 to the positions in which the tapered roller bearings $5_1$, $5_2$ are respectively disposed is different from each other, the central point GC in the face width GW direction of the pinion 1 and the middle point 5C of the distance between the load application points 5P, 5P of both the tapered roller bearings $5_1$, $5_2$ will deviate from each other and, as a result, the contact gear ratio cannot effectively be improved. In such a case, the central area may be present in a position between the center GC in the face width direction of the pinion 1 and the middle point 5C of the distance between the load application points 5P, 5P of both the tapered roller bearings $5_1$, $5_2$. In addition, the amount of modification $R_1$ at the time of performing the crowning can be calculated by the following formula (1)

$$A \times \frac{Cm}{\sqrt{1 - \cos^2\alpha \times \sin^2\beta}} \leq R_1 \leq B \times \frac{Cm}{\sqrt{1 - \cos^2\alpha \times \sin^2\beta}}$$

where Cm is the maximum clearance, α is the pressure angle, β is the helix angle, and A, B are influence coefficients, respectively, relative to the degree of deformation when the pinion contacts the gear wheel.

According to the above-mentioned arrangement, even if a large precession occurs to the pinion 1 during the rotation of the pinion 1, the pinion 1 and the gear wheel 2 come to be in gearing mesh with each other to follow the precession. In this manner, the tooth bearing area can be secured to the maximum, thereby improving the contact gear ratio. As a result, there can be reduced the vibrations and noises including side bands that occur when the pinion 1 and the gear wheel 2 come into gearing mesh with each other. Further, since only crowning is performed on the tooth surface 11 in the flank line direction so as to have the shape of a sinusoidal curve, machining can be performed by using a widely used conventional toothed wheel grinder that can perform a 2-D tooth surface modification in an equivalent time on the tooth surface 11 in the tooth flank line direction. The cost for manufacturing pinions 1 can be prevented from rising. Still furthermore, since the central area is arranged to be present in a position between the face width center GC of the pinion 1 and the middle point 5C of the distance between the load application points 5P, 5P of both the tapered roller bearings $5_1$, $5_2$, even if at least one of the above-mentioned items (1) to (3) may vary, the tooth bearing area can surely be secured, thereby improving the contact gear ratio.

Figure 6:
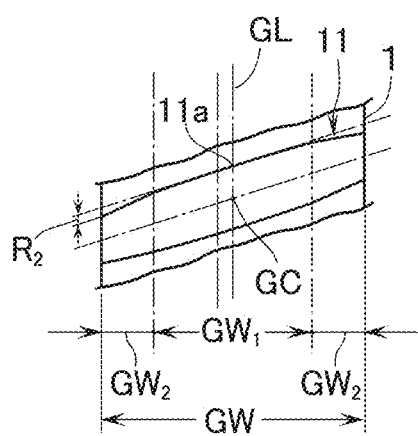
FIG. 6 is a diagram to explain the tooth surface modification in the flank line direction relating to another embodiment.

According to the above-mentioned embodiment, a description has been made, by way of an example, of the one in which, relative to the tooth surface 11 in the flank line direction, crowning was performed so that the tooth surface 11 has a sinusoidal curve that can be expressed by a single sinusoidal function and that has a sinusoidal curve extending over an entire width in the face width GW direction of the pinion 1. This invention, however, is not limited to the above. An explanation is made with reference to the same members or elements by using the same reference numerals with reference to FIG. 6. The pinion 1 according to another embodiment (second embodiment) is constituted: by performing, on the tooth surface 11 in the flank line direction, crowning in a shape of a sinusoidal curve in which the apex 11a is positioned in the central area as seen in the face width GW direction and which can be expressed by a single sinusoidal function in a manner that the sinusoidal curve extends over a range $GW_1$ of above 55% of the entire width in the face width GW direction of the pinion 1; and by performing relieving in an arc shape on the remaining portions $GW_2$, $GW_2$ on both end sides in the direction of the face width GW. By the way, in case at least one of the above conditions (1) through (3) varies, in the same manner as above, the central area may be positioned between the center GC in the face width direction of the pinion 1 and the middle point 5C of the distance between the load application points 5P, 5P of both the tapered roller bearings $5_1$, $5_1$. Further, relieving may be performed by combining two or more arc shapes of varying radii. Still furthermore, the amount of modification $R_2$ in the flank line direction when the crowning and the relieving on both end surfaces of the face width GW are added can be calculated by the following formula (2)

$$A \times \frac{Cm}{\sqrt{1-\cos^2\alpha \times \sin^2\beta}} \leq R_2 \leq B \times \frac{Cm}{\sqrt{1-\cos^2\alpha \times \sin^2\beta}}$$

where, in a manner similar to the above, Cm is the maximum clearance, $\alpha$ is the pressure angle, $\beta$ is the helix angle, and A, B are influence coefficients relative to the degree of deformation when the helical pinion contacts the helical gear wheel.

Next, in order to confirm the effect of this invention, the following experiments were performed. That is, a pinion 1 and a gear wheel 2 of a gear device GM were manufactured respectively so as to have the above-mentioned gear specifications. Crowning was performed on the pinion 1 so that the tooth surface 11 has a shape of a sinusoidal curve with an apex 11a being positioned on the center line GL in the face width GW direction of the pinion 1, the curve being expressed by a single sinusoidal function and extending over the entire width of the face width GW. This is defined as an invention product 1 (according to the first embodiment). In this case, the amount of modification $R_1$ was made to be 0.045 mm. Further, crowning was performed on the pinion 1 in a sinusoidal curve with an apex 11a being positioned on the center line G in the face width direction of the pinion 1, the sinusoidal curve being expressed by a single sinusoidal function and extending over a range $GW_1$ of 55% in the face width direction of the pinion 1. Relieving was also performed in an arc shape on the remaining portions $GW_1$, $GW_2$ on both end sides in the face width direction GW. The product thus obtained was defined as this invention product 2 (according to the second embodiment). In this case, the amount of modification $R_2$ by adding the crowning and the relieving was made to be 0.06 mm. As a comparison example, a pinion 1 and a gear wheel 2 of the gear device GM were manufactured, in the same manner as those described above having the above-mentioned gear specifications. And relative to the pinion 1, the tooth surface was subjected to crowning in an arc curve (e.g., radius $R \approx 17685$ mm) with respect to the tooth surface in the flank line direction, and relieving was performed on both end sides in the face width direction in an arc curve of a radius which is different from the arc curve at the time of the crowning in question. Modification of the tooth surface was thus performed such that the amount of modification in the flank line direction by adding the crowning and relieving at both end surfaces in the face width direction became 0.070 mm (prior art product).

Figure 7:
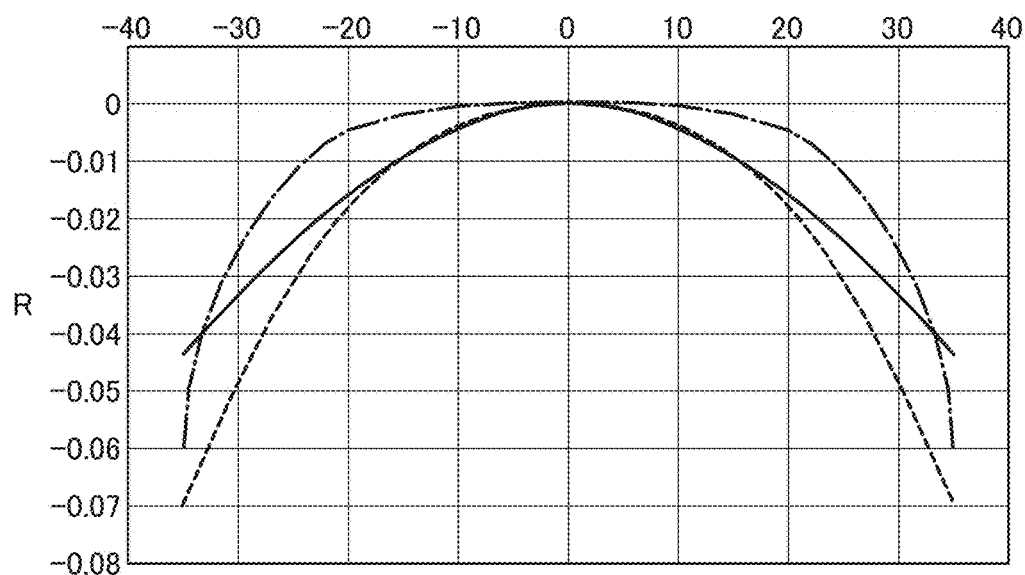
FIG. 7 is a graph to show respectively the shape of tooth surface modification of a pinion manufactured by applying this invention (this invention product) and a pinion manufactured according to the conventional example (prior art product).
Figure 8A:
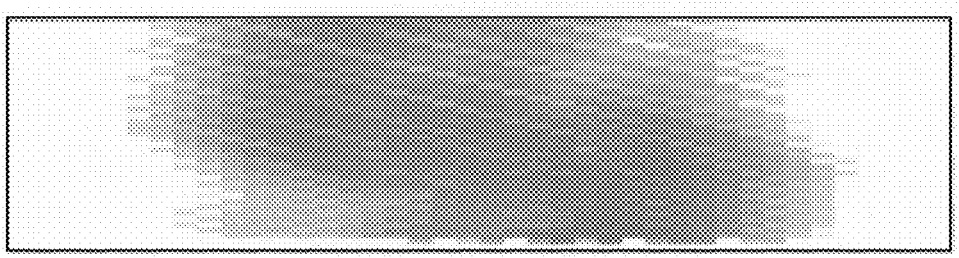
FIGS. 8(a) to 8(c) are charts to show the results of simulation analysis of the tooth bearing areas of the pinion of this invention products 1, 2 and the pinion of the prior art product.
Figure 8B:
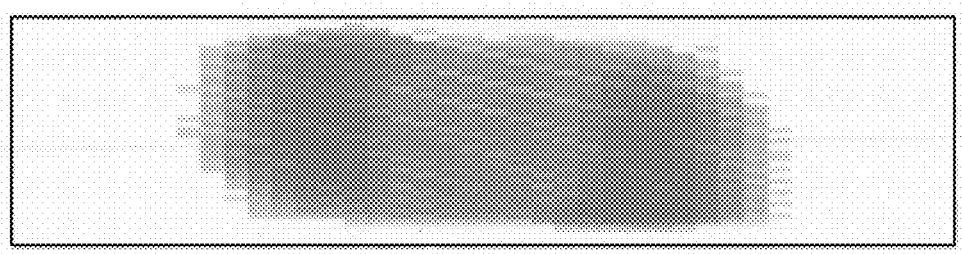
Figure 8C:
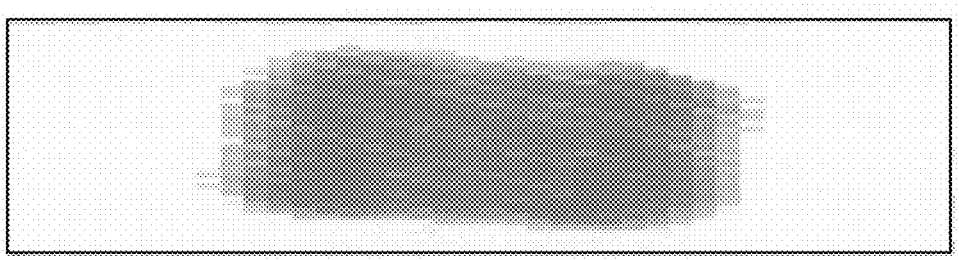

FIG. 7 shows graphs of modified shapes of the tooth surfaces of this invention products and of the prior art product. In FIG. 7, the solid line refers to this invention product 1, the dashed line refers to this invention product 2, and the dotted line refers to the prior art product. According to these graphs, it can be seen that the modified shapes in the flank line direction are apparently different from each other. Next, with reference to this invention products 1 and 2, as well as the prior art product, the tooth bearing area of the pinion relative to the gear wheel when the pinion and the gear wheel were rotated in gear mesh with each other, were subjected to simulation analysis by using an analyzing software (manufactured by Toyo Denki Seizo Kabushiki Kaisha). The results are shown in FIGS. 8(a) to 8(c). According to the analysis results, the tooth bearing area in the prior art product was about 39% (see FIG. 8(c)). On the other hand, this invention product 1 has as large as about 64% of tooth bearing area (see FIG. 8(a)). It has thus been confirmed that the tooth bearing area has been improved by about 1.6 times of the one in the prior art product. In addition, regarding this invention product 2, too, the tooth bearing area was about 48% (see FIG. 8(b)). It has thus been confirmed that the tooth bearing area has been improved by about 1.2 times of the one in the prior art product. It can thus be seen that the contact gear ratio largely improved.

Figure 9:
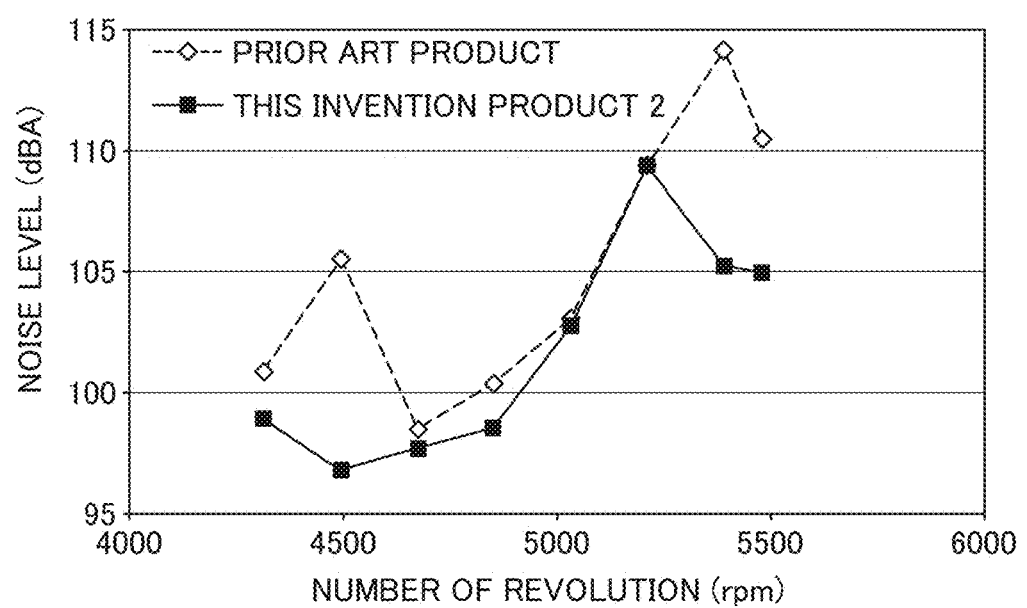
FIG. 9 is a graph showing the results of noise measurements by using the invention product 2 and the prior art product.

Next, by using this invention product 2 and the prior art product, the number of revolution was varied within a range of 4310 rpm to 5478 rpm, and the noise level at that time was measured, the results being shown in FIG. 9. According to the measurement results, it has been confirmed that, particularly, when the number of revolution of the pinion exceeds 4490 rpm and exceeds 5200 rpm, the noise level can be effectively lowered as a result of improvement in the contact gear ratio.

Description has so far been made of embodiments of this invention. However, this invention shall not be limited to the above embodiments but can appropriately be modified within the scope of this invention not departing from the inventive concept of this invention.

DESCRIPTION OF REFERENCE NUMERALS

RC railway vehicle gear device of parallel cardan drive system
GM gear device
1 helical pinion (small gear, referred to as pinion)
2 helical gear wheel (large gear, referred to as gear wheel)
11 tooth surface
11a apex
GW face width
GC middle point in face width direction
3 rotation axis
4 gear box
$5_1$, $5_2$ tapered roller bearing
5P load application points of tapered roller bearings
5C middle point between load application points of tapered roller bearings
$R_1$, $R_2$ amount of modification at the time of crowning

What is claimed is:

1. A railway vehicle gear device of parallel cardan drive system comprising a helical pinion and a helical gear wheel which together constitute a helical gear pair and which respectively have gear specifications of module of 4 to 8, pressure angle of 20 to 30°, and helix angle of 15 to 30°, wherein crowning is performed on a tooth surface in a flank line direction of the helical pinion, characterized in that the tooth surface of the helical pinion has a shape of a sinusoidal curve that can be expressed by a single sinusoidal function with an apex being positioned in a central area in a face width direction of the helical pinion, and that the sinusoidal curve extends over an entire width in the face width direction of the helical pinion.

2. The railway vehicle gear device of parallel cardan drive system according to claim 1, wherein the helical pinion fixed to a rotation axis is housed inside a gear box, and rotation axis portions positioned on both axial sides of the helical pinion are respectively supported rotatably by the gear box through tapered roller bearings, wherein the central area lies between a center in the face width direction of the helical pinion and a middle point between load application points of both the tapered roller bearings.

3. The railway vehicle gear device of parallel cardan drive system according to claim 1, wherein an amount of modification $R_1$ when the crowning is performed is set within a range of the following formula (1)

$$A \times \frac{Cm}{\sqrt{1 - \cos^2\alpha \times \sin^2\beta}} \leq R_1 \leq B \times \frac{Cm}{\sqrt{1 - \cos^2\alpha \times \sin^2\beta}}$$

where Cm is a maximum clearance in the flank line direction between the helical pinion and the helical gear wheel, the maximum clearance being capable of occurrence as a result of precession of the helical pinion while rotating, α is a pressure angle, β is a helix angle, and A, B are influence coefficients relative to a degree of deformation when the helical pinion contacts the helical gear wheel.

4. A railway vehicle gear device of parallel cardan drive system comprising a helical pinion and a helical gear wheel which together constitute a helical gear pair and which respectively have gear specifications of module of 4 to 8, pressure angle of 20 to 30°, and helix angle of 15 to 30°, characterized in that the tooth surface of the helical pinion in the flank line direction is subjected to crowning in a sinusoidal curve that can be expressed by a single sinusoidal function and extends over a range of above 55% of a total width, in the face width direction, of the helical pinion, and that the remaining portion on both end sides in the face width direction is subjected to relieving in an arc shape.

5. The railway vehicle gear device of parallel cardan drive system according to claim 4, wherein an amount of modification $R_2$ in the flank line direction when adding the crowning and the relieving on both the end surfaces of the face width is set within a range of the following formula (2)

$$A \times \frac{Cm}{\sqrt{1 - \cos^2\alpha \times \sin^2\beta}} \leq R_2 \leq B \times \frac{Cm}{\sqrt{1 - \cos^2\alpha \times \sin^2\beta}}$$

where Cm is a maximum clearance, in the flank line direction, between the helical pinion and the helical gear wheel, the maximum clearance being capable of occurrence as a result of precession of the helical pinion while rotating, α is a pressure angle, β is a helix angle, and A, B are influence coefficients relative to a degree of deformation when the helical pinion contacts the helical gear wheel.

6. The railway vehicle gear device of parallel cardan drive system according to claim 2, wherein an amount of modification $R_1$ when the crowning is performed is set within a range of the following formula (1)

$$A \times \frac{Cm}{\sqrt{1 - \cos^2\alpha \times \sin^2\beta}} \leq R_1 \leq B \times \frac{Cm}{\sqrt{1 - \cos^2\alpha \times \sin^2\beta}}$$

where Cm is a maximum clearance in the flank line direction between the helical pinion and the helical gear wheel, the maximum clearance being capable of occurrence as a result of precession of the helical pinion while rotating, α is a pressure angle, β is a helix angle, and A, B are influence coefficients relative to a degree of deformation when the helical pinion contacts the helical gear wheel.

* * * * *